United States Patent [19]
Collin et al.

[11] 4,073,642
[45] Feb. 14, 1978

[54] METHOD FOR REDUCING MATERIAL CONTAINING IRON OXIDES

[75] Inventors: Per Harald Collin, Falun; Sune Natanael Flink; Bjorn Widell, both of Vasteras, all of Sweden; Martin Hirsch, Frankfurt am Main; Lothar Reh, Bergen-Enkheim, both of Germany

[73] Assignee: Stora Kopparbergs Bergslags Aktiebolag, Falun, Sweden

[21] Appl. No.: 610,391

[22] Filed: Sept. 4, 1975

[51] Int. Cl.² .......................................... C21B 13/02
[52] U.S. Cl. ........................................ 75/35; 75/26; 75/91
[58] Field of Search ................... 75/26, 34, 35, 91

[56] References Cited

U.S. PATENT DOCUMENTS

| | | | |
|---|---|---|---|
| 2,343,780 | 3/1944 | Lewis | 75/26 |
| 2,742,353 | 4/1956 | Ogorzaly | 75/26 |
| 2,794,725 | 6/1957 | Scharmann | 48/206 |
| 3,057,680 | 10/1962 | Schytil et al. | 75/35 |
| 3,224,869 | 12/1965 | Keith et al. | 75/35 |
| 3,375,099 | 3/1968 | Marshall | 75/35 |
| 3,469,969 | 9/1969 | Schenck et al. | 75/26 |
| 3,579,616 | 5/1971 | Reh et al. | 75/35 |
| 3,788,835 | 1/1974 | Lewis | 75/26 |
| 3,985,547 | 10/1976 | Iacotti et al. | 75/34 |

FOREIGN PATENT DOCUMENTS

| | | | |
|---|---|---|---|
| 415,247 | 11/1967 | Australia | 75/34 |
| 678,562 | 1/1964 | Canada | 75/35 |
| 1,585,196 | 1/1970 | France | 75/34 |
| 1,767,628 | 3/1972 | Germany | 75/26 |
| 1,458,765 | 2/1969 | Germany | 75/34 |
| 1,146,041 | 3/1963 | Germany | 75/26 |
| 1,092,889 | 11/1960 | Germany | 75/26 |
| 838,067 | 6/1960 | United Kingdom | 75/34 |
| 1,063,446 | 3/1967 | United Kingdom | 75/34 |

OTHER PUBLICATIONS

Reh, Fluidized Bed Processing, *Chem. Eng. Progress,* vol. 67, No. 2, Feb. 71, pp. 58–63.

*Primary Examiner*—M. J. Andrews
*Attorney, Agent, or Firm*—Curtis, Morris & Safford

[57] ABSTRACT

A method of reducing a pulverized material containing iron oxides mixed with carbonaceous material wherein: (a) a circulating fluidized bed is maintained in a vertically elongated reaction zone by supplying it with suitable quantities of pulverized material containing iron oxides, pulverized solid carbonaceous material and optionally liquid carbonaceous material, and gas containing molecular oxygen and that gas and solid material leaving the reaction zone are separated, the solid material being returned to the reaction zone; (b) the pulverized material containing iron oxides, the carbonaceous material and the gas containing molecular oxygen are supplied to an intermediate section of the reaction zone; (c) the flow of carbonaceous material fed to the bed is controlled so that there is always sufficient coke in the bed to prevent interference of the fluidization caused by sticking or agglomeration; (d) gas and solid material leaving the reaction zone are extracted from the upper part of the reaction zone, the solid material being separated from the gas and being returned to the intermediate section of the reaction zone; (e) a portion of the gaseous reaction zone exhaust, after dust separation and elimination of most of carbon dioxide and water, is fed to the lower part of the reaction zone as fluidizing and reduction gas; and (f) solid material containing completely or partially reduced iron oxides is drawn from the lower part of the reaction zone.

12 Claims, 1 Drawing Figure

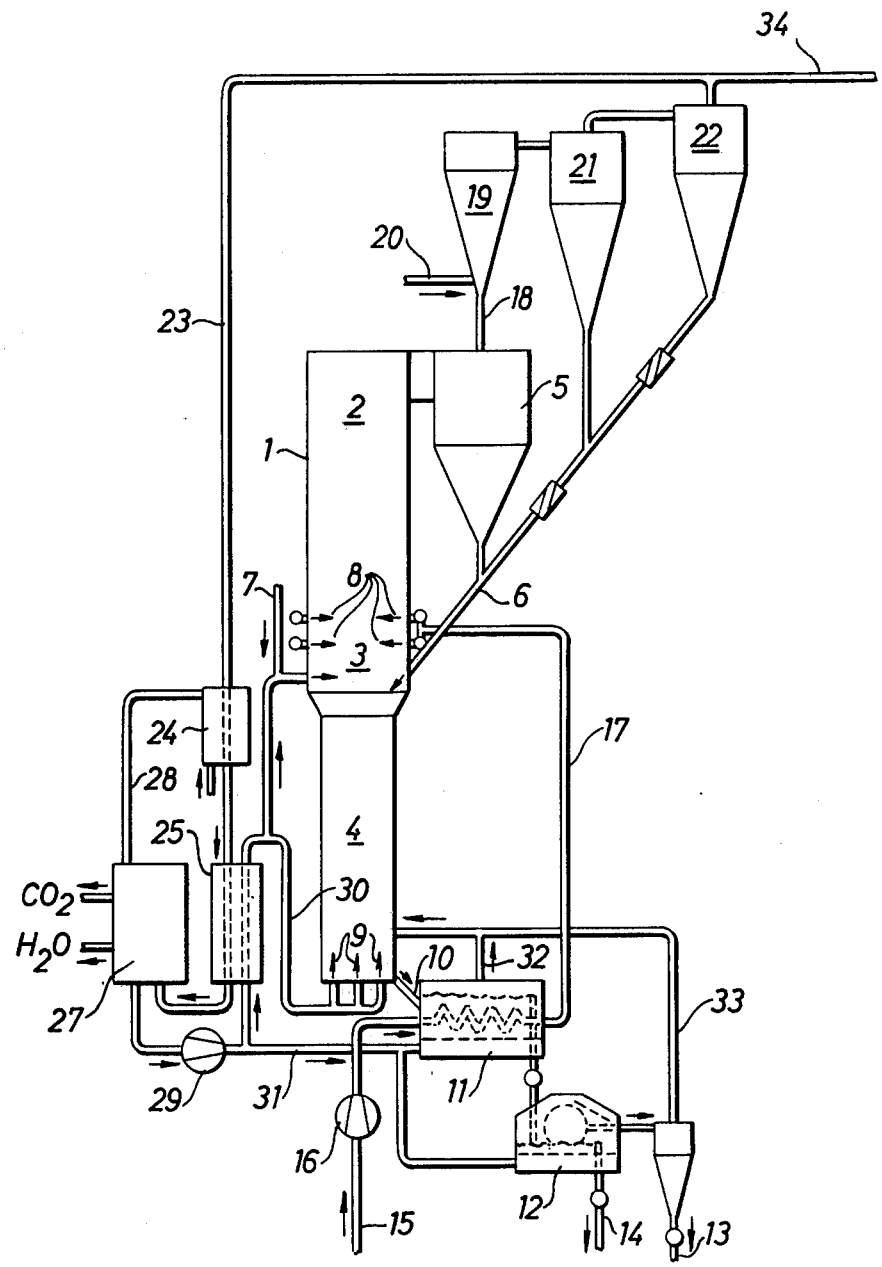

METHOD FOR REDUCING MATERIAL CONTAINING IRON OXIDES

The present invention relates to a method of completely or partially reducing pulverized material containing iron oxides mixed with finely disintegrated, solid carbonaceous material at a temperature lower than the melting point of iron. More particularly, the present invention is directed to a fluidized bed process which provides three different reaction zones in the fluidized bed as a result of which the various reaction streams, recirculating streams, and exhaust streams are combined in a unitary process based on the coaction or interaction of these streams.

By solid carbonaceous material is meant coke obtained from a fuel and/or reducing agent and containing carbon, examples are an anthracite, coal or oil.

By pulverized material containing iron oxides is meant iron ore concentrate, calcined pyrites or other material containing iron oxide, said material having a particle size of up to 1 mm.

It has already been proposed to reduce pulverized material containing iron oxides mixed with pulverized, solid carbonaceous material, for example in rotary furnaces or in fluidized beds of conventional type.

The present invention does not make use of a fluidized bed of conventional type but instead uses a so-called circulating fluidized bed. General conditions for a circulating fluid in these beds are described in L. Reh, Chem. Engineering Progress, February, 1971, vol. 67, No. 2, p. 58–63.

Most attempts to utilize the fluid bed technique for reducing material containing iron oxides which have been made so far have used the conventional fluid bed technique, whereupon the difficulties have been encountered which are caused by the gas being kept in the bed for only a short while.

Endeavors to increase the effect in such a process by increasing the reaction temperature have also resulted in problems of sticking, i.e., the small particles of material in the bed have agglomerated to form larger particles and aggregates and finally made fluidization impossible.

Thus, now the contact time between gas and particles can be increased by using a circulating fluid bed in which the tendency of sticking is also less due to the vigorous internal circulation of the material. Sticking increases with increasing temperature, degree of metallization and fineness of the bed material and decreases with increasing turbulence, gangue content, total pressure and addition of pulverized diluting material, such as coke.

According to the invention, experiments have been performed reducing the pulverized material containing iron oxides mixed with pulverized, solid, carbonaceous material in a circulating fluid bed where the carbonaceous material is partially combusted with a gas containing molecular oxygen, which is introduced as fluidization gas in the bed. Due to the addition of the solid, pulverized carbonaceous material, the risk of sticking has been decreased and it has been possible to increase the temperature, thus increasing the reaction rate. However, when the gas containing molecular oxygen is blown in through distributors in the bottom of the reactor for fluidization, there is even in this event a certain tendency towards agglomeration at the distributors, probably due to local overheating.

Thus, the present invention relates to a method of reduction of pulverized material containing iron oxides with pulverized carbonaceous material in a circulating fluid bed while substantially entirely avoiding sticking between the particles. Moreover, a device for performing this method has also been provided.

According to the invention, a circulating fluid bed of pulverized material containing iron oxides, mixed with pulverized carbonaceous material, is maintained in a vertically elongated reaction zone. The circulating fluidized bed is maintained by supplying it, with suitable introduction, with the pulverized material containing iron oxides, pulverized solid carbonaceous material and possibly liquid carbonaceous material, together with gas containing molecular oxygen. A mixture of gas and solid material leaves the reaction zone and is subjected to gas-solid separation, after which the solid material is returned to the reaction zone.

The pulverized material containing iron oxides supplied to the fluid bed has a particle size of less than 1 mm, preferably less than 0.5 mm. the desintegrated, solid carbonaceous material supplied may be such as coke breeze, anthracite dust or coal dust and should have a particle size of less than 3 mm, preferably less than 1 mm.

The reaction zone may be thought of as divided into an upper part, a lower part and an intermediate part. In the method according to the invention, the pulverized material containing iron oxides, the carbonaceous material and the gas containing molecular oxygen are fed into the intermediate section. Partial combustion of the carbonaceous material in this section generates the heat necessary for the process. Coking and degassing of carbonaceous material takes place in the upper part of the reaction zone, as well as reduction by carbon of carbon dioxide and water formed during the combustion to form hydrogen gas and carbon monoxide. A certain amount of reduction of the material containing iron oxides also takes place here. This reaction suitably takes place at a temperature of 850°–1000° C. The flow of solid carbonaceous material must be controlled so that there is always sufficient carbonaceous material in the fluidized bed to prevent interference of the fluidization due to agglomeration. Gas produced is discharged from the upper-part mixed with the solid material from the bed. The solid material is separated from the gas and returned to the intermediate section.

It has been found that the ability of the solid carbonaceous material to prevent sticking is dependent on the temperature and the properties of the material containing iron oxides. At a temperature of 900° C and using normal iron ore concentrate, it has been found that the weight ratio between solid carbonaceous material (coke) and iron ore concentrate in the reaction zone should be at least 0.05:1, a preferred range is from 0.1:1 to 1:1.

Part of the gas discharged is subjected to additional dust separation, most of $CO_2$ and $H_2O$ is removed from the gas, and it is reintroduced in the lower part of the reaction zone as fluidization and reducing gas. A strongly reducing atmosphere is thus maintained in the lower part and continued reduction of the material containing iron oxides takes place; this gas typically has the following analysis: 24.5% CO, 1.2% $CO_2$, 7.7% $H_2$, 0.4% $H_2O$, 2.5% hydrocarbons, 63.7% $N_2$.

Solid material is discharged as required from the lower part of the reaction zone, so that the quantity of solid material in the reaction zone is kept constant.

Typically, the solid material, for iron ore concentrate being reduced as the following analysis:

$Fe_{met}$: 43.5%
FeO: 24.6%
Coke: 23.6%
Gangue, Ash: 8.3%.

Net transport of solid material is thus obtained countercurrently to the gas introduced into the lower part. The heat transfer from the intermediate section of the reaction zone to the lower part, however, is maintained mainly through the internal circulation of material in the reaction zone. This internal circulation is considerable, thus promoting temperature equilization. The solid material discharged consists of coke and completely or partially reduced iron oxides as indicated above and is preferably cooled to below the Curie point of iron (i.e., to give it ferromagnetic properties) and separated magnetically into a substantially coke-free iron fraction and a substantially iron-free coke fraction. The cooling is suitably carried out by allowing the material to pass into a conventional fluid bed formed by the material itself, with built-in cooling surfaces. The gas containing molecular oxygen is suitably used as coolant and is thereby preheated.

It is advisable to control the flow of gas containing molecular oxygen, for example, air possibly mixed with $CO_2$ and/or $H_2O$, (from 0% to 10% for $CO_2$ and from 0% to 10% for $H_2O$ by volume) so that the heat requirement for maintaining the desired temperature in the circulating bed is achieved. The heat is generated by partial combustion of the carbonaceous material. It is also feasible to supply heat, either solely or partially, indirectly from an external source of heat such as a nuclear reactor. In this case, heat may be transferred by hot gas to heating surfaces built into the reaction zone.

In order to prevent excessive generation of the heat per unit volume of the reaction zone, which would cause local over-heating and risk of a certain amount of agglomeration of the fluidized bed material, the flow of gas containing molecular oxygen is preferably divided into several sub-streams which are introduced at separate points on several levels in the intermediate section of the reaction zone.

The solid carbonaceous material is suitably supplied to the intermediate section of the reaction zone in several jets, preferably with the help of reducing and/or neutral gas blown through nozzles. However, with carbonaceous material having a low content of volatile constituents, such as anthracite, it is possible to use gas containing molecular oxygen such as air, in which case this is preferably not preheated in order to avoid the risk of local overheating. For this purpose a total flow of gas comprising 10 – 30% of the total flow of the carbonaceous material will be required, depending on the shape of the available blowing nozzles.

It is also possible to introduce the carbonaceous material via a smaller, auxiliary reaction zone, separate from the reaction zone, in which a fluid bed is maintained with the help of a partial flow of the gas containing molecular oxygen. In this case, gas and solid material are conducted from the auxiliary reaction zone through a common pipe into the intermediate section of the reaction zone. A certain amount of the partial combustion of the carbonaceous material takes place in the auxiliary reaction zone and agglomeration around the distributor openings can therefore be avoided due to the short time which the carbonaceous material spends there, which means that only a few particles have time to be burnt to ashes. With too high concentrations and in the event of local overheating, this may easily result in agglomeration and crusting.

Some of the solid carbonaceous material may be replaced by liquid carbonaceous material, such as oil in an amount up to 60% by weight. In this case, it is preferably sprayed into the intermediate section of the reaction zone through a number of jets. So-called atomization of the oil as done in connection with complete combustion, is not necessary. The relatively rough dispersion of the oil which is obtained if it is supplied by a number of streams through pipes together with a non-oxidizing gas, is sufficient. A volume ratio of 100:1 is suitable for gas and oil used. If an auxiliary reaction zone is used, the oil is preferably supplied to this zone and the level at which it is supplied should be about 0.5 m above the distribution bottom for the gas containing molecular oxygen.

The exhaust from the reaction zone can at least partially be used for preheating the feed material containing iron oxides, by being brought into direct contact with the feed material. Thereafter, this portion of the exhaust is recirculated to the lower part of the reaction zone, after elimination of most of $CO_2$ and $H_2O$ in a manner well known in the art, and is used as fluidizing and reducing gas in the lower part of the reaction zone.

A portion of the exhaust stream, substantially freed from $CO_2$ and $H_2O$, is suitably used as fluidizing gas in the cooling and magnetic separation of the material discharged from the lower part of the reaction zone. By performing the entire process above atmospheric pressure, for example 1 – 10 atm, the dimensions necessary for the apparatus can be considerably reduced.

The heat content (physical and chemical) of the exhaust stream is suitably used to generate electric energy with which, for example, the reduced ferrous material can be melted and possibly finally reduced.

The method and means according to the invention will be further explained with reference to the embodiment of the invention shown in the FIGURE wherein:

The apparatus consists of vertically elongated reactor 1, the upper part 2 of which encloses the upper part of the reaction zone, the central part 3 of the reactor enclosing the intermediate section of the reaction zone and its lower part 4 the lower part of the reaction zone. A cyclone 5 is connected to the upper part 2 of the reactor and has a return conduit 6 leading to the central part of the reactor. There are also one or more inlets for carbonaceous material 7 in the central zone.

The gas containing molecular oxygen is supplied to the central part 3 of the reactor divided in a number of streams, through nozzles 8, while the recirculated (recycled) gas is supplied to the lower part 4 of the reactor through a suitable distributor 9. Treated solid material is discharged through an outlet 10 in the lower part of the reactor, cooled in a cooling device 11 and passed to a magnetic separator 12 in which it is separated into a substantially coke-free fraction 13 and a substantially iron-free coke fraction 14.

The gas containing molecular oxygen, preferably air, is blown through line 15 through the cooling device where it is preheated, and on through the line 17 to nozzles 8. The cooling device 11 is preferably in the form of a conventional fluid bed with built-in cooling elements through which the gas containing molecular oxygen is led for preheating.

Some of the exhaust (for instance 50 percent) from the exhaust pipe 18 from the cyclone 5 is led via valve 16 to a venturi device 19 where it preheats the pulverized material containing iron oxides, for instance ore concentrate entering via line 20, possibly mixed with return coke from the magnetic separator. The flow of gas and material is then conveyed to a cyclone 21 and then to a fine cleaning cyclone 22 in which the solid material is separated and returned to the central part of the reactor, preferably through the return conduit 6. The gas, cleaned from solid material, is conveyed along a conduit 23, possibly being cooled indirectly at 24 by boiling water, and through a heat exchanger 25 to scrubbers 27 where it is substantially freed from $CO_2$ and $H_2O$. Cooling by boiling water may be necessary to prevent the temperature in the heat exchanger from becoming too high for the materials used. $H_2O$ can be removed through direct or indirect cooling. $CO_2$ is washed out, for instance using alkaline solutions, in which case the steam in line 28 from the broiler 24 can be used to regenerate these solutions. If the pressure in the system is sufficiently high, $Co_2$ can be washed out with water. Most of the gas coming from the scrubbers, which is driven by a compressor 29, is heat-exchanged at 25 with gas entering the scrubbers and is introduced as fluidizing and retucing gas into the lower part 4 of the reactor. This produces a strongly reducing zone through which the solid material passes before being discharged. In view of the smaller gas flow, this part of the reactor is suitably given a smaller diameter than the upper part. A partial stream of the gas in line 31 substantially free of $CO_2$ and $H_2O$ is used without heat exchange as fluidizing gas in the cooling device 11 for discharged solid material and in the magnetic separator 12 and is then conveyed via 32 and 33 into the lower part of the reactor. The remainder of the exhaust from the cyclone 5, possibly together with a sub-stream of the coke fraction from the magnetic separation, is conveyed in a conduit 34, preferably to be used as fuel in a thermal power station, while the rest of the coke flow is recirculated to the reactor, possibly mixed with the feed containing iron oxides, and/or used as reducing agent in a melt reduction step for the iron fraction from the magnetic separator.

EXAMPLE

This example relates to the operation of an apparatus as illustrated in the drawing. The vertical reactor 1 had a height of 20 m. The lower portion 4 of the reactor had a diameter of 1.5 m and the upper portion 2 had a diameter of 2 m. The temperature in the reactor was approximately 900° C. The quantities given below relate to a period of time of 1 minute. All percentages given are by weight. All volumes of gas are defined as gas having normal pressure and temperatures.

Iron ore in the form of concentrates of $Fe_3O_4$ containing 6.7% gangue was supplied to the apparatus through the conduit 20 at a rate of 561 kg. Carbonaceous material was supplied through the conduit 7 at a rate of 230 kg. This material consisted of pulverulent coal containing 56.0% solid carbon, 5.0% water, 4.8% oxygen, 27.2% volatile constituents, and 7.0% ash. Solid material was discharged from the bottom portion of the reactor through the conduit 10 at a rate of 635 kg. This material contained 47.0% metallic iron, 26.6% FeO, 17.6% coke, and 8.8% gangue and ash. The feed of material to the reactor through the conduit 6 amounted to approximately 5000 kg and had approximately the composition given for the material in the conduit 10. The material withdrawn through the conduit 13 amounted to 507 kg and consisted of 52.2% metallic iron, 29.6% FeO, 8.0% coke, and 10.2% gangue and ash. The material withdrawn through the conduit 14 amounted to 128 kg and consisted of 7.8% metallic iron, 4.7% FeO, 86.0% coke, and 1.5% gangue and ash. Air was supplied through the conduit 15 at a rate of 480 m³, was pre-heated in the device 11, and was supplied to the reactor through the pipe 17 and the nozzles 8. Exhaust gas was withdrawn from the cyclone separator 5 at a rate of 1000 m³. 700 m³ were withdrawn through the conduit 34, and 300 m³ were conveyed through the conduit 23 to the scrubbers 27. The gas flowing through the conduit 23 contained 21.1% CO, 10.5% $CO_2$, 6.7% $H_2$, 4.7% $H_2O$, 2.1% hydrocarbons, and 54.9% $N_2$. The gas withdrawn from the scrubbers 27 by means of the compressor 29 contained 24.5% CO, 1.2% $CO_2$, 7.7% $H_2$, 0.4% $H_2O$, 2.5% hydrocarbons, and 63.7% $N_2$. 260 m³ of this gas were conveyed through the conduit 30 to the nozzles 9 in the bottom of the reactor, while 40 m³ were conveyed through the conduit 31 to be used as fluidizing gas in the device 11 and in the magnetic separator 12. The temperature in the magnetic separator was approximately 600° C. After having been thus used for fluidizing purposes said gas was conveyed to the lower portion 4 of the reactor through the conduits 32 and 33.

What is claimed is:

1. A method of reducing a pulverized material containing iron oxides mixed with carbonaceous material, comprising:
   (a) maintaining in a vertically uninterrupted, elongated reaction zone a circulating fluidized bed, said circulating fluid bed being maintained by
      1) continually withdrawing a portion of fluidized solids and fluidizing gas and a gas formed by reaction in said reaction zone,
      2) separating said gas and solids,
      3) continually returning a portion of said solid material to said reaction zone for circulating of said solids in said bed without a solid gas interface in said bed, and
      4) continually returning said separation gas to said elongated reaction zone as a fluidizing gas, said reaction zone consisting essentially of lower, intermediate, and upper reaction zones;
   (b) supplying said bed with a suitable quantity of pulverized material containing iron oxides and pulverized solid carbonaceous material as said solid material and liquid carbonaceous material, said liquid carbonaceous material being from 0 to 60% by weight of the carbonaceous material and, as a gas for reaction with said solid material, a gas containing molecular oxygen;
   (c) supplying said pulverized material containing iron oxides, said carbonaceous material and said gas containing molecular oxygen, to the intermediate reaction zone of said reaction zone, said intermediate reaction zone being at a position of about middle of said elongated reaction zone;
   (d) controlling the carbonaceous material feed into said reaction zone so that there is always sufficient solid carbonaceous material in the bed to prevent the defluidization of said bed caused by sticking;
   (e) withdrawing gas and solid material from the upper reaction zone, said solid material being withdrawn, being separated from the gas and said solid material being continually returned to said intermediate reaction zone of said reaction zone;

(f) feeding a portion of said withdrawn gas, after dust separation and elimination of substantially all carbon dioxide and water, to said lower part of said reaction zone as fluidizing and reducing gas, said carbon dioxide being formed by reaction of carbon in said carbonaceous material with oxygen in said ore or molecular oxygen in said molecular oxygen containing gas and said water being formed by reaction of hydrogen from said carbonaceous material with oxygen in said ore or molecular oxygen in said molecular oxygen containing gas; and (g) withdrawing a solid material containing completely or partially reduced iron oxides from the lower part of the reaction zone.

2. The method as defined in claim 1 including introducing in said elongated reaction zone a stream of the molecular oxygen containing gas which is admixed with carbon dioxide and water, wherein said carbon dioxide is from 0% to 10% and water is from 0% to 10% by volume based on said stream, and controlling the introduced amount thereof so as to provide the heat requirement for maintaining the desired temperature in elongated reaction zone by combustion of carbonaceous material.

3. The method as defined in claim 1 wherein the solid material withdrawn from the lower part of the reaction zone is being cooled to below the Curie point of iron in the solid material, containly completely or partially reduced iron oxides, and thereafter, separating magnetically said cooled solid material into a substantially coke-free iron faction and a substantially iron-free coke fraction, said coke having been formed in said reaction zone from said solid carbonaceous material.

4. The method as defined in claim 3 including freeing from carbon dioxide and water a portion of a recirculated gas which is leaving the upper part of said reaction zone and fluidizing with said freed gas in a magnetic separation zone said iron and said coke.

5. The method as defined in claim 1 including introducing the solid carbonaceous material into an auxiliary reaction zone, wherein said auxiliary reaction zone is separated from said elongated reaction zone, fluidizing and partially combusting said solid carbonaceous material with part of the gas containing molecular oxygen, after which a formed gas, the gas containing molecular oxygen, and said partially reacted solid material are introduced into said intermediate section of the reaction zone.

6. The method as defined in claim 1 wherein the carbonaceous material is being blown into the intermediate reaction zone of said elongated reaction zone by a non-oxidizing gas.

7. The method as defined in claim 1 including introducing the gas containing molecular oxygen into the intermediate reaction zone of said reaction zone, divided into a number of smaller streams.

8. The method as defined in claim 1 including substantially freeing said recirculated gas from carbon dioxide and water after passing through one or more heat exchange zones and fluidizing said solid material withdrawn from the lower part of the reaction zone by a part of the recirculated gas.

9. The method as defined in claim 8 wherein the gas containing molecular oxygen prior to entry in said fluidized bed is being heat exchanged by passing it through a heat exchanging zone in heat exchanging relationship with said fluidized bed whereby cooling of said fluidized bed is achieved.

10. The method as defined in claim 1 including directly contacting a portion of the withdrawn stream of solid and gas from the circulating fluid bed with a feed containing iron oxides for preheating said feed and thereafter recirculating said gas to the lower part of the reaction zone after removal of substantially all of carbon dioxide and water therefrom.

11. The method as defined in claim 1 including maintaining the entire process above atmospheric pressure.

12. The method as defined in claim 4 including returning a partial stream of the coke fraction from said magnetic separation zone to said reaction zone.

* * * * *